US008820857B2

(12) United States Patent
Eberling et al.

(10) Patent No.: US 8,820,857 B2
(45) Date of Patent: Sep. 2, 2014

(54) APPARATUS AND METHOD FOR PREVENTING PARKING BRAKE-CAUSED VEHICLE DISABLING

(75) Inventors: Charles E. Eberling, Wellington, OH (US); James E. Szudy, Parma, OH (US); John G. Nosse, Grafton, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 286 days.

(21) Appl. No.: 13/272,878

(22) Filed: Oct. 13, 2011

(65) Prior Publication Data

US 2013/0092483 A1    Apr. 18, 2013

(51) Int. Cl.
*B60T 17/16*    (2006.01)

(52) U.S. Cl.
USPC ..... 303/75; 303/89; 303/122.09; 303/122.15; 303/123; 303/127; 188/151 A; 188/170

(58) Field of Classification Search
USPC .................. 303/75, 89, 9.76, 122.03, 122.09, 303/122.15, 123, 127; 188/170, 151 A
See application file for complete search history.

(56) References Cited

U.S. PATENT DOCUMENTS

| | | | |
|---|---|---|---|
| 1,905,077 A | 4/1933 | Walker | |
| 2,103,349 A | 12/1937 | Conant et al. | |
| 2,664,101 A | 12/1953 | Betancourt Cano et al. | |
| 3,116,095 A | 12/1963 | Leighton | |
| 3,140,126 A | 7/1964 | Elliott | |
| 3,617,096 A | 11/1971 | Grabb et al. | |
| 3,838,895 A | 10/1974 | Deem | |
| 4,057,298 A | 11/1977 | Seegers | |
| 4,182,535 A * | 1/1980 | Fannin | 303/9 |
| 4,596,426 A * | 6/1986 | Clapp | 303/89 |
| 4,673,222 A | 6/1987 | Knight | |
| 5,004,300 A * | 4/1991 | Brearley et al. | 303/15 |
| 5,425,571 A * | 6/1995 | Wallestad et al. | 303/7 |
| 5,445,440 A * | 8/1995 | Plantan | 303/7 |
| 5,553,928 A * | 9/1996 | Hart et al. | 303/7 |
| 5,700,063 A * | 12/1997 | Kiel et al. | 303/9.61 |
| 7,077,481 B2 * | 7/2006 | Marsh et al. | 303/40 |
| 7,866,761 B2 * | 1/2011 | Gerum et al. | 303/9.61 |
| 8,078,378 B2 * | 12/2011 | Bradley, IV | 701/70 |
| 2003/0075973 A1 * | 4/2003 | Soupal | 303/113.1 |
| 2006/0284479 A1 * | 12/2006 | Hoover et al. | 303/89 |
| 2009/0256416 A1 * | 10/2009 | Bensch et al. | 303/17 |

* cited by examiner

*Primary Examiner* — Thomas J Williams
*Assistant Examiner* — Mariano Sy
(74) *Attorney, Agent, or Firm* — Crowell & Moring LLP

(57) ABSTRACT

An apparatus and method for preventing parking brake-caused disabling of a vehicle is provided. In at least one of the vehicle's parking brake release actuators' supply lines there is provided a flow arrangement which allows parking brake release fluid to flow to and from the release actuator when its supply line is undamaged, and restricts flow from the release pressure source when the line between the flow arrangement and the actuator is damaged. The flow arrangement may be a pilot-operated, non-graduated control valve, a combination of a pressure protection valve and a check valve arranged in parallel, a velocity-sensing check valve, or any other device or combination of devices which provide the damaged line shutoff or metering functionality. Such an arrangement prevents automatic application of the parking brake by releasing pressure from all of the vehicle's parking brake actuators, thereby precluding automatic vehicle immobilization following damage at one wheel end.

15 Claims, 3 Drawing Sheets

APPARATUS AND METHOD FOR PREVENTING PARKING BRAKE-CAUSED VEHICLE DISABLING

BACKGROUND AND SUMMARY OF THE INVENTION

The present invention relates to a vehicle braking systems, and in particular to an apparatus and method for preventing complete immobilization of a vehicle in the event of a failure in a parking brake circuit at a wheel end.

Commercial vehicle are typically equipped with spring-actuated/fluid released parking brake systems, in particular pneumatic systems which utilize compressed air to release the parking brake actuator of each wheel end's spring brake actuator. The parking brakes in such a vehicle remain released as long as the parking brake release pressure is maintained in spring brake actuators. Such systems typically have a common source of pressure connected to each wheel end's spring brake actuator, such that application of pressure to the common lines simultaneously releases the vehicle's parking brakes.

A single point of failure in such systems may result in application of all of the wheel end spring brake actuators' parking brake actuators, effectively immobilizing the vehicle. For example, in a typical 6×4 vehicle, a rupture of any one of the four pneumatic lines to the wheel ends could result in parking brake release pressure being bled off from all four spring brake actuators. This has been the standard industry design practice, as a failure of a single brake actuator or the pressure delivery to a single axle has been viewed as a serious event warranting automatic full application of all of the vehicle's brakes as desirable "fail safe" outcome, particularly where dragging a locked wheel or an applied brake in an on-highway situation for an extended period might result in a thermal event.

Notwithstanding the common industry design practice, there may also be situations in which full parking brake application and the resulting complete immobilization of the vehicle could have undesired consequences. For example, in a commercial application of a vehicle with multiple axles such as a logging truck, being forced to park or automatically immobilize the vehicle in the event of a parking brake release pressure failure at one wheel end may be highly undesirable when the vehicle is at a very remote location (such as deep in a forest on a logging road), where repair facilities are far away and/or the immobilization of the vehicle may block a much-needed passage, such as a fire road in the case of a logging truck or the travel lanes of a high speed, high vehicle volume highway in the case of an over-the-road commercial.

Other examples where automatic application of all spring brake parking brakes in the event of a single wheel end failure may be undesirable include heavy police vehicles or military vehicles which may be subjected to combat conditions such as criminal attacks or exposure to improvised explosive devices ("IEDs"). During such an event, damage to a pneumatic line serving one wheel end in a prior art common-supply parking brake system could cause all of the wheel ends' parking brakes to be immediately applied, effectively immobilizing the vehicle in a location where the vehicle and its personnel would be vulnerable to further attacks.

It therefore would be desirable to have a parking brake system which, in addition to permitting full parking brake release and application capability in normal operating conditions, also responds to a line failure at one wheel end in a manner which provides for continued reliable release and application of the parking brakes of the remaining undamaged wheel ends.

One of the design constraints which has inhibited development of such a parking brake system is U.S. Federal Motor Vehicle Safety Standard ("FMVSS") section 121, which requires the parking brake system to be capable of being applied within a very short period (less that 3.0 seconds from initial movement of the control device to less than 3 psi in the spring brake chamber, per the current FMVSS 121 regulation). In addition, if there is a loss of primary air brake circuit, all of the spring brakes are used to still meet the stopping distance requirement in the FMVSS and assist in keeping the vehicle in the lane. Additional valves in the delivery path to the spring brake actuator affect the spring brake modulation (i.e., the responsiveness of the spring brake actuator). Due to these time, pressure and distance requirements, those of skill in the art have sought to avoid placing additional devices in the pressure supply lines, as such intermediate components are associated with system time-response performance degradation.

The present invention solves these and other problems of the prior art by arranging devices at each wheel end which, while not inhibiting flow to such an extent that the FMVSS 121 3.0 second brake application limit is exceeded, function as wheel end shut-off devices to isolate the damaged wheel end from the remaining portions of the parking brake system while not restricting flow during spring brake modulation.

In one embodiment of the present invention, a pilot-operated, non-graduated pneumatic control valve, for example, a Bendix SV-1 Synchro Valve, available from Bendix Commercial Vehicle Systems LLC of Elyria, Ohio, is placed in the pneumatic supply line to a wheel end, between the wheel end's spring brake actuator and an upstream pressure modulator, with the pilot-operated, non-graduated pneumatic control valve's pilot control input and pressure supply input being connected in parallel (known in the art as "common supply") to effect automatic operation of the control valve.

With this arrangement, if the supply line between the discharge port of the valve and the wheel end's spring brake actuator is breached, it has been determined in testing that the sudden decrease in pressure in the line upstream of the breach (the pressure drop resulting in from the sudden high rate of flow out of the breached line) will result in the pressure at the pilot control port dropping low enough to cause the control valve's internal piston stem to retract, automatically shutting off the flow of pressurized air from the upstream pressure modulator to the control valve's discharge port and venting the control valve through its exhaust port to atmosphere. It was also determined that the addition of the pilot-operated, non-graduated pneumatic control valve did not degrade system response times enough to prevent compliance with FMVSS 121. A further advantage of the present invention is that it may be implemented at minimal cost, using existing components re-purposed and appropriately adjusted and/or calibrated (for example, adjustment of the pilot pressure shut-off set point) for use in.

Thus, with the present invention if the damage at one wheel end is not severe enough to by itself prevent motion of the vehicle, the prevention of automatic application of the remaining parking brakes may allow the vehicle to be moved away from its present position. For example, in a situation in which a vehicle with the present invention has been damaged at one wheel end by an IED, the operator may have the ability to still drive the vehicle to a safer location because the remaining wheel ends remained free to rotate.

In another embodiment of the present invention, similar functionality may be obtained with the combination of a pressure protection valve and a check valve, for example, a Bendix PR-4 valve and a SC-1 Single Check valve, both also available from Bendix Commercial Vehicle Systems LLC, installed in parallel to one another in the supply line between the wheel end's spring brake actuator and the upstream pressure modulator. During normal operation, pressure is supplied from the upstream pressure modulator through the pressure protection valve to the wheel end's spring brake actuator. During abnormal conditions, similar to the pilot-operated, non-graduated pneumatic control valve such as an SV-1 Synchro Valve, a sudden decrease in pressure from a ruptured line to the wheel end's spring brake actuator will result in the pressure protection valve automatically closing to shut off the flow from the upstream pressure modulator. However, because pressure protection valves typically do not have local exhaust ports, a check valve arranged in parallel with the pressure protection valve must be provided to provide a positive pressure relief path from the spring brake actuator during normal operations. By providing a pressure protection valve in parallel with a check valve, the arrangement ensures that in normal operation there remains a flow path which permits pressure to be removed from the spring brake actuator back through the pressure modulator (the flow-permitted direction of the check valve), while also ensuring that this normally-open flow path is shut when the downstream line is breached to prevent discharge of pressure from the upstream pressure modulator (the flow-blocked direction of the check valve).

In another embodiment, a velocity-sensing check valve may be placed in the line between the pressure modulator and the spring brake actuator at each wheel end. Such a valve is actuated to limit (i.e., meter) flow when the fluid medium passing therethrough reaches a predetermined velocity. With appropriate adjustment ("tuning") of the valve actuating set point, the valve would permit normal pressure flow in normal operations (i.e., flow from the upstream pressure modulator to the spring brake actuator to release the parking brake, and flow back out of the spring brake actuator to set the parking brake), while still being ready to cut off high velocity flow resulting from rupture of the line to the spring brake actuator.

The identification of the foregoing flow control components is not intended as an exhaustive listing of flow control arrangements, as any other flow control device or combination of devices which provide the automatic damaged line shutoff functionality are within the scope of the present invention. In addition, the invention is not limited to damage affecting solely the lines between the flow control components and a parking brake actuator, but includes any damage at a wheel end which may result in the release of parking brake release pressure, such as damage to the parking brake release actuator portion of a wheel end's spring brake actuator.

Other objects, advantages and novel features of the present invention will become apparent from the following detailed description of the invention when considered in conjunction with the accompanying drawings.

DETAILED DESCRIPTION OF THE DRAWINGS

Figure 1:
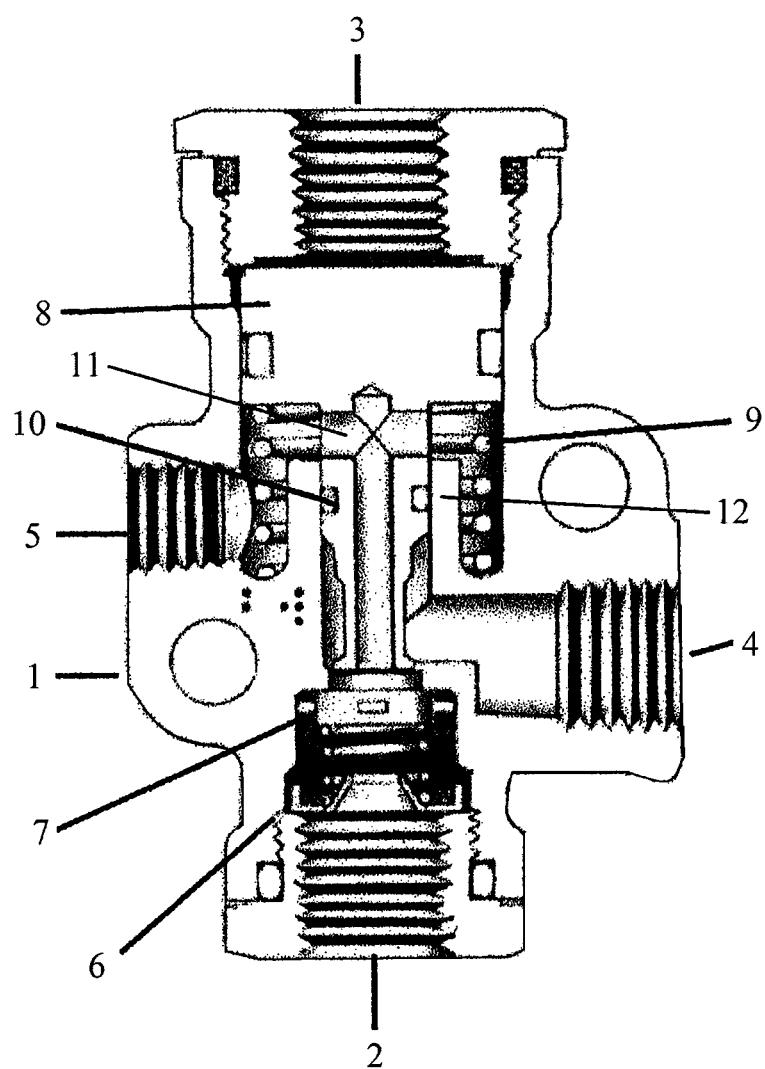
FIG. 1 is a cross-section view of a pilot-operated, non-graduated pneumatic control valve.

FIG. 1 is a cross-section view of a pilot-operated, non-graduated pneumatic control valve, in this example a Bendix SV-1 valve. The valve has a valve body 1 having four ports: supply inlet port 2, pilot control inlet port 3, pressure delivery port 4 and exhaust port 5. During normal operation, fluid pressure is supplied to supply inlet port 2 and is initially stopped in supply chamber 6 by supply control piston 7, which is resting on its seat in valve body 1. Pressure is allowed to flow from supply inlet port 2 to pressure delivery port 4 once pilot control pressure is applied to pilot control inlet port 3, and the pilot control pressure applied to piston 8 rises high enough cause piston 8 to overcome the biasing force of spring 9. As the piston 8 moves against the spring 9, the piston stem 10 closes the exhaust and moves the supply control piston 7 off of its seat, allowing supply pressure to pass from supply inlet port 2 to pressure delivery port 4. If the pilot control pressure applied to piston 8 is decreased below a pressure sufficient to overcome the biasing force of spring 9, the piston's movement back toward the pilot control inlet port 3 will cause the piston stem 10 to draw the supply control piston back to its seat, shutting of pressure supply to the pressure delivery port 4. At the same time, as the piston stem 10 is withdraw, the internal passage 11 rises out of bore 12, establishing fluid communication between the pressure delivery port 4 and the exhaust port 5. This results in exhausting of the pressure medium from the pressure delivery port 4 via the exhaust port 5. Typically, this latter function is implemented as a direct venting of the delivery lines connected to port 4 to atmosphere via exhaust port 5.

Figure 2:
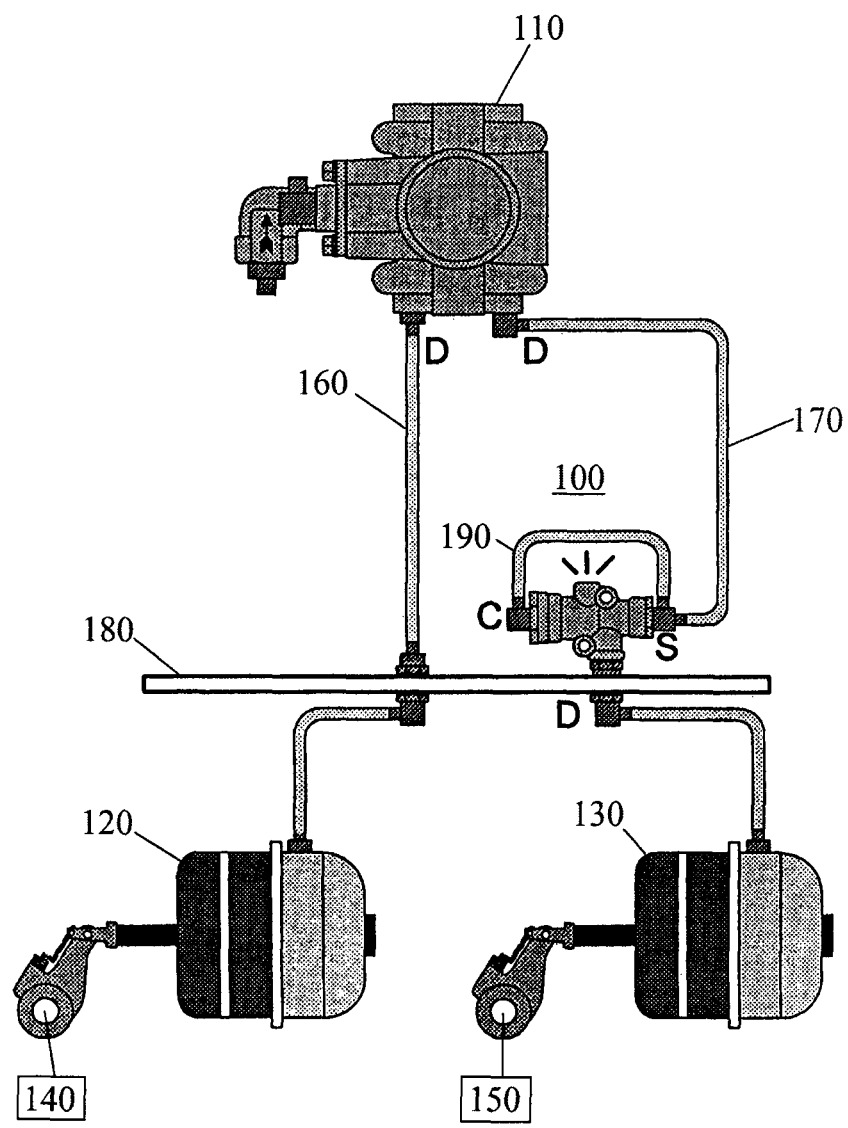
FIG. 2 is a schematic diagram of a cross-section view of a system for preventing parking brake immobilization of a vehicle in accordance with an embodiment of the present invention.

There are multiple ways in which the supply, pilot control, delivery and exhaust ports of a pilot-operated, non-graduated pneumatic control valve may be connected. For the purposes of the present invention, FIG. 2 schematically illustrates a parking brake control system arrangement in which pilot-operated, non-graduated pneumatic control valve 100 provides the shut-off protection of the present invention. The control valve 100 is located downstream of a pressure modulating valve 110 through which pneumatic pressure is applied to the parking brake release ports of the spring brake actuators 120, 130 associated with the brakes 140, 150 of two vehicle wheel ends, via lines 160, 170 from the pressure modulator's discharge ports D. The lines 160, 170 are schematically shown passing through plate 180, to which control valve 100 is also mounted. Further, in this embodiment there is no wheel end-isolating device arrangement located in the line 160 between the pressure modulating valve 110 and the other spring brake actuator 120, i.e., while the arrangements of the present invention may be applied to all wheel ends of a vehicle, this is not required. Accordingly, the present invention's isolation capability may be omitted on individual wheel ends, for example, at wheel ends judged to not be vulnerable to parking brake release pressure disruption, or where costs are to be minimized by only providing isolation capability for a subset of a vehicle's wheel ends.

In the FIG. 2 embodiment, the control valve's supply inlet port S and pilot control inlet port C are connected in parallel via line 190 to line 170. With this "common" supply arrangement, the control valve 100 is arranged for automatic actuation to permit pressure to flow from the pressure modulating valve 110 to the spring brake actuator 130 via the control valve 100 delivery port D when the pressure in line 170 reaches the control valve's pilot set point pressure. With this arrangement, during normal operation the parking brake within spring brake actuator 130 may be released by normal supply of pressure via line 170 and control valve 100 to the spring brake actuator 130. Conversely, when during normal operation it is desired to apply the parking brake, the pressure in line 170 may be reduced until the pressure falls below the pilot set point pressure and control valve 100 shuts off communication between line 170 and the spring brake actuator 130. As the connection with line 170 is shut, the delivery port D of the control valve 100 is placed in fluid communication with the control valve's exhaust port so that the parking brake release pressure in spring brake actuator 130 is discharged to atmosphere to allow the actuator's power spring to apply the parking brake.

Figure 3:
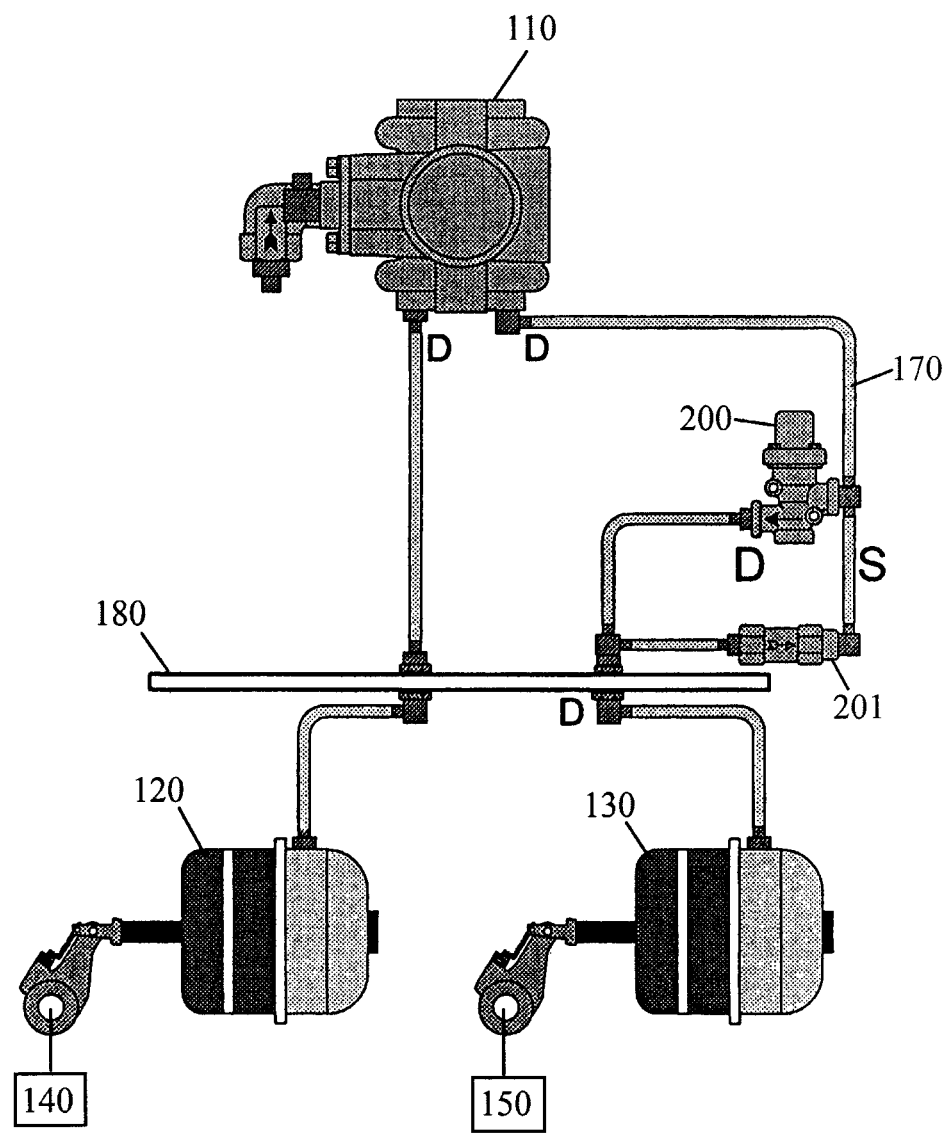
FIG. 3 is a schematic diagram of a cross-section view of a system with a graduated pneumatic control valve for preventing parking brake immobilization of a vehicle in accordance with another embodiment of the present invention.

FIG. 3 schematically illustrates another embodiment of the present invention in which a pressure protection valve 200 and a check valve 201 are utilized in lieu of control valve 100 of FIG. 2. In this arrangement, the check valve 201 is arranged in parallel with the pressure protection valve 200. With the check valve 201 oriented such that flow is permitted toward the pressure modulating valve 110 and prevented toward the spring brake actuator 130. During normal operations the fluid medium, in this embodiment air, is permitted to flow from the pressure modulating valve 110 through pneumatic line 170 and the pressure protection valve 200 to the spring brake actuator 130 to release the parking brake. When the parking brake is to be set by removing pressure from the parking brake release chamber of spring brake actuator 130, flow is permitted to pressure modulating valve 110 from the spring brake actuator 130 via the check valve 201 and line 170.

In the event of a rupture of the pneumatic line downstream of the pressure protection valve 200 and the check valve 201, the pressure protection valve 200 will response to the sudden decrease in line pressure by shutting to prevent further flow from the pressure modulating valve 110 to atmosphere. At the same time, due to the orientation of the check valve 201, flow out of the ruptured line from the pressure modulating valve 110 is prevented by the check function of the valve. Accordingly, in an urgent situation in which continued vehicle mobility is desired in the event of damage to a wheel end of a vehicle, this embodiment also prevents undesired loss of pressure throughout the parking brake system and consequent locking of all of the vehicle brakes.

FIG. 3 also provides an illustration of a further embodiment of the present invention, in that the functionality provided by the pressure protection valve 200 may effectively be integrated into the check valve 201. This may be accomplished, for example, with the use of a velocity-sensing check valve, in which case the FIG. 3 diagram would show only the check valve 201 in line 170. With a velocity-sensing check valve, the valve's triggering threshold fluid velocity may be set such that during normal operations the supply of air to and from the spring brake actuator 130 may proceed in both directions through the velocity-sensing check valve 201 (i.e., the threshold may be set above the maximum expected normal operation fluid velocity of the supply and return flows). In the event of the abnormal condition of a downstream line rupture, the sudden increase in pressure differential in line 170 (the difference the pressure at pressure modulating valve 110 and the open-to-atmosphere line) would result in such high fluid velocity that check valve's velocity-sensing components would trigger and block further flow from line 170. This embodiment therefore also provides the desired prevention of parking brake application at damaged wheel ends.

The foregoing disclosure has been set forth merely to illustrate the invention and is not intended to be limiting. For example, rather than providing flow control arrangement dedicated to a single wheel end, a single flow control arrangement may serve both wheel ends of an axle of the vehicle, such that in the event of damage to the lines of that axle, the parking brake release actuators of the remaining axle(s) may be maintained in the released position so that the vehicle may be moved if the other axles can overcome the resistance of the wheels of the damaged axle. Because other such modifications of the disclosed embodiments incorporating the spirit and substance of the invention may occur to persons skilled in the art, the invention should be construed to include everything within the scope of the appended claims and equivalents thereof.

What is claimed is:

1. An apparatus for preventing parking brake-caused disabling of a vehicle, comprising:
    at least two vehicle wheel ends, each having a fluid-actuated parking brake release actuator;
    a parking brake release fluid pressure source connected to each of the parking brake release actuators via respective fluid supply lines; and
    at least one parking brake release fluid flow control arrangement, wherein each of the at least one parking brake release fluid flow control arrangements
        is connected to a respective one of the parking brake release actuators via a respective one of the fluid supply lines, and
        is arranged to permit parking brake release fluid to flow between the parking brake release fluid pressure source and the respective parking brake release actuator when the vehicle is not damaged, and to restrict fluid flow from the parking brake release fluid pressure source through the parking brake release fluid flow control arrangement when parking brake release fluid pressure cannot be contained between the parking brake release fluid flow control arrangement and its respective parking brake release actuator.

2. The parking brake apparatus of claim 1, wherein the at least one parking brake release fluid flow control arrangement is one of a pilot-operated, non-graduated control valve, a combination of a pressure protection valve and a check valve arranged in parallel with one another, and a velocity-sensing check valve.

3. The parking brake apparatus of claim 2, wherein the parking brake release fluid is a gas.

4. The parking brake apparatus of claim 3, wherein the parking brake release fluid pressure source is a pressure modulating valve.

5. The parking brake apparatus of claim 4, wherein the vehicle has one parking brake release fluid flow control arrangement for each wheel end.

6. The parking brake apparatus of claim 1, wherein the parking brake release fluid flow control arrangement is arranged to shut off parking brake release fluid flow when at least one of its respective parking brake release actuator and a portion of the fluid supply line between the parking brake release fluid flow control arrangement and the respective parking brake release actuator cannot contain pressurized parking brake release fluid.

7. An apparatus for preventing parking brake-caused disabling of a vehicle, comprising:
    at least two vehicle wheel ends, each having a fluid-actuated parking brake release actuator;
    means for controlling a pressure of a parking brake release fluid in a fluid-actuated parking brake release actuator; and means for controlling fluid flow between the means for controlling the pressure in the parking brake release fluid and the parking brake release actuator, wherein the fluid flow controlling means is arranged to control the flow of the parking brake release fluid between the means for controlling the pressure in the parking brake release fluid and the parking brake release actuator when at least one of the parking brake release actuator and a portion of a parking brake release fluid supply line between the fluid flow controlling means and the parking brake release actuator cannot contain pressurized parking brake release fluid.

8. The parking brake apparatus of claim 7, wherein the fluid flow controlling means is one of a pilot-operated, non-graduated control valve, a combination of a pressure protection valve and a check valve arranged in parallel with one another, and a velocity-sensing check valve.

9. The parking brake apparatus of claim 8, wherein the parking brake release fluid is a gas.

10. The parking brake apparatus of claim 9, wherein the means for controlling fluid pressure is a pressure modulating valve.

11. The parking brake apparatus of claim 10, wherein the vehicle has one fluid flow controlling means for each wheel end.

12. A method of operating a vehicle with a damaged parking brake release line, comprising the acts of:

releasing parking brakes of the vehicle prior to damage to a parking brake system of the vehicle, wherein the parking brake system includes:

a parking brake release fluid pressure source connected to each of a plurality of fluid-actuated parking brake release actuators via respective fluid supply lines; and a parking brake release fluid flow control arrangement provided in each fluid supply line between the parking brake release fluid pressure source and each fluid-actuated parking brake release actuator, each of the parking brake release fluid flow control arrangements being arranged to permit parking brake release fluid to flow from and to the parking brake release fluid pressure source during undamaged fluid supply line operation, and to restrict fluid flow from the parking brake release fluid pressure source when a portion of the fluid supply line between one of the parking brake release fluid flow control arrangements and its respective fluid-actuated parking brake release actuator and the respective fluid-actuated parking brake release actuator is damaged;

operating the vehicle to cause vehicle motion after damage to at least one fluid supply line between one of the parking brake release fluid flow control arrangements and its respective fluid-actuated parking brake release actuator.

13. The method of claim 12, wherein the parking brake release fluid flow control arrangements are at least one of a pilot-operated, non-graduated control valve, a combination of a pressure protection valve and a check valve arranged in parallel with one another, and a velocity-sensing check valve.

14. The parking brake apparatus of claim 13, wherein the parking brake release fluid is a gas.

15. The parking brake apparatus of claim 14, wherein the parking brake release fluid pressure source is a pressure modulating valve.

* * * * *